(No Model.) 4 Sheets—Sheet 1.
G. A. CHAPMAN.
HORSE POWER.
No. 387,491. Patented Aug. 7, 1888.
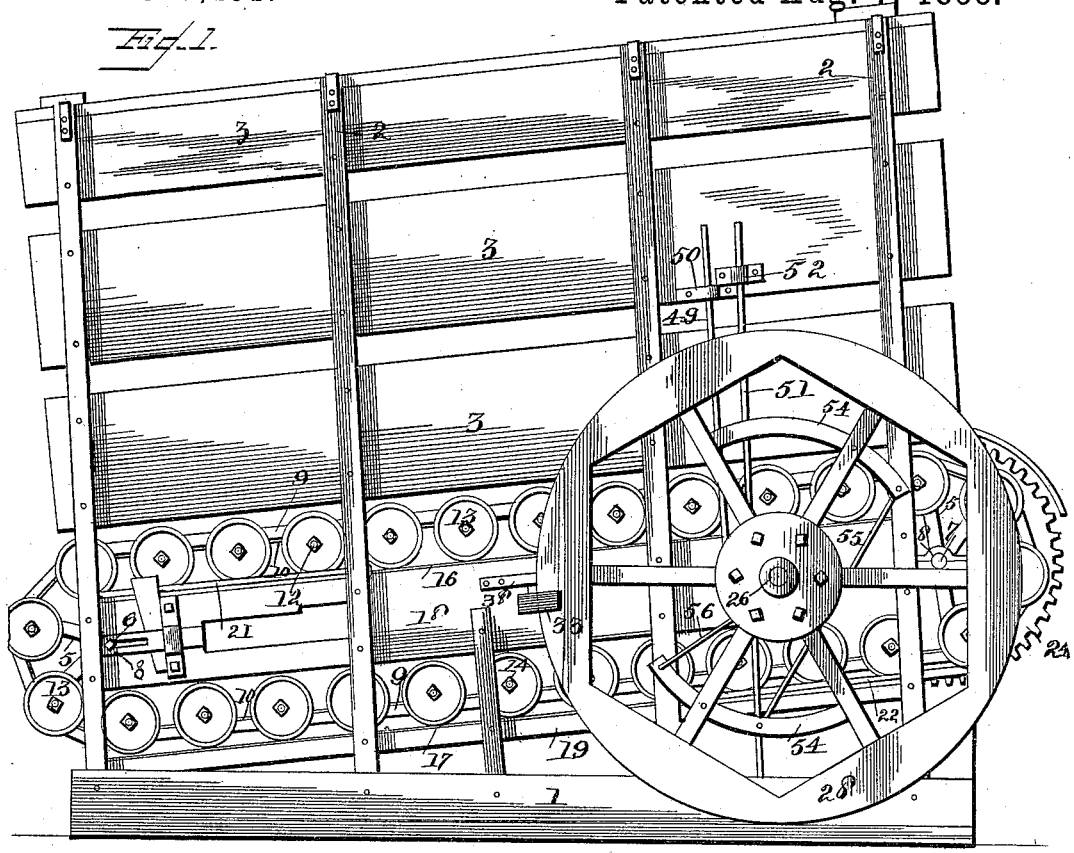
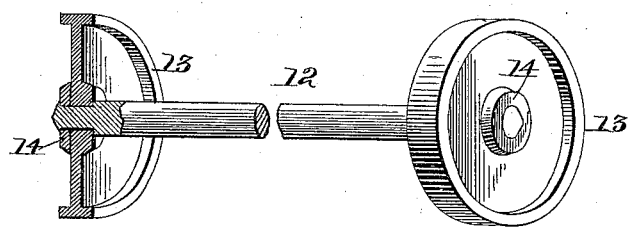
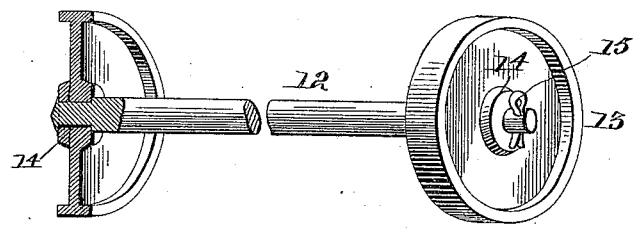
WITNESSES
F. L. Durand
Benj. E. Cowl
INVENTOR
Henry A. Chapman
by Louis Bagger & Co.
Attorneys (No Model.) 4 Sheets—Sheet 2.

G. A. CHAPMAN.
HORSE POWER.

No. 387,491. Patented Aug. 7, 1888.

WITNESSES
F. L. Durand.
Benj. G. Cowl.

INVENTOR
Henry A. Chapman
by Louis Bagger & Co.
Attorneys (No Model.) 4 Sheets—Sheet 3.
G. A. CHAPMAN.
HORSE POWER.
No. 387,491. Patented Aug. 7, 1888.
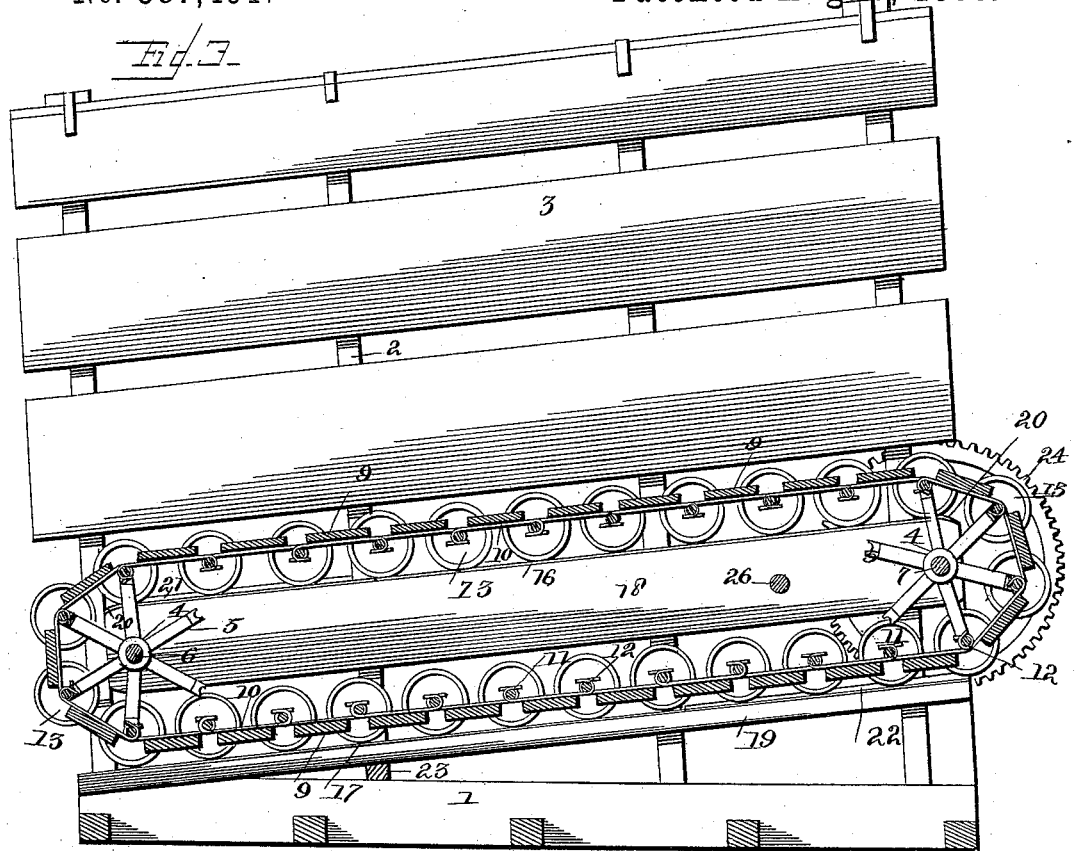
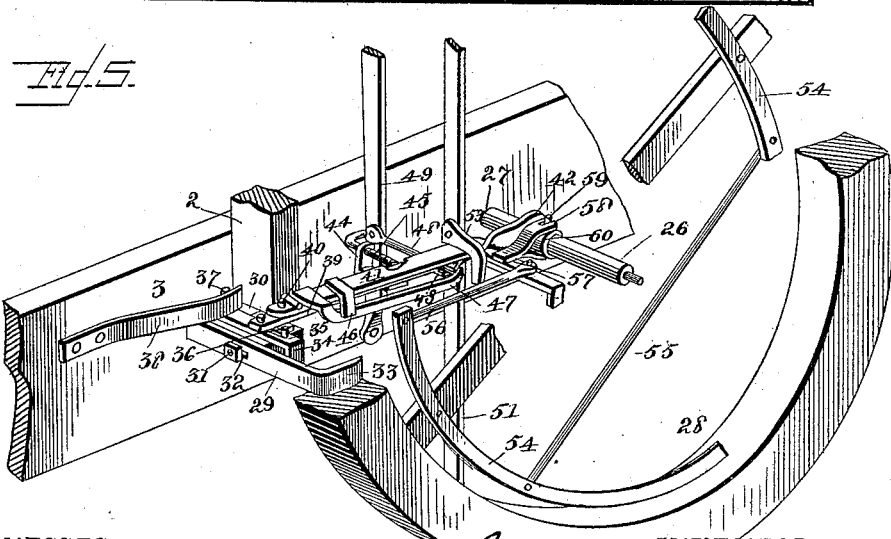
WITNESSES.
F. L. Durand.
Benj. G. Cowl.
INVENTOR.
Henry A. Chapman.
By Louis Bagger & Co.
Attorneys.

(No Model.) 4 Sheets—Sheet 4.
G. A. CHAPMAN.
HORSE POWER.
No. 387,491. Patented Aug. 7, 1888.
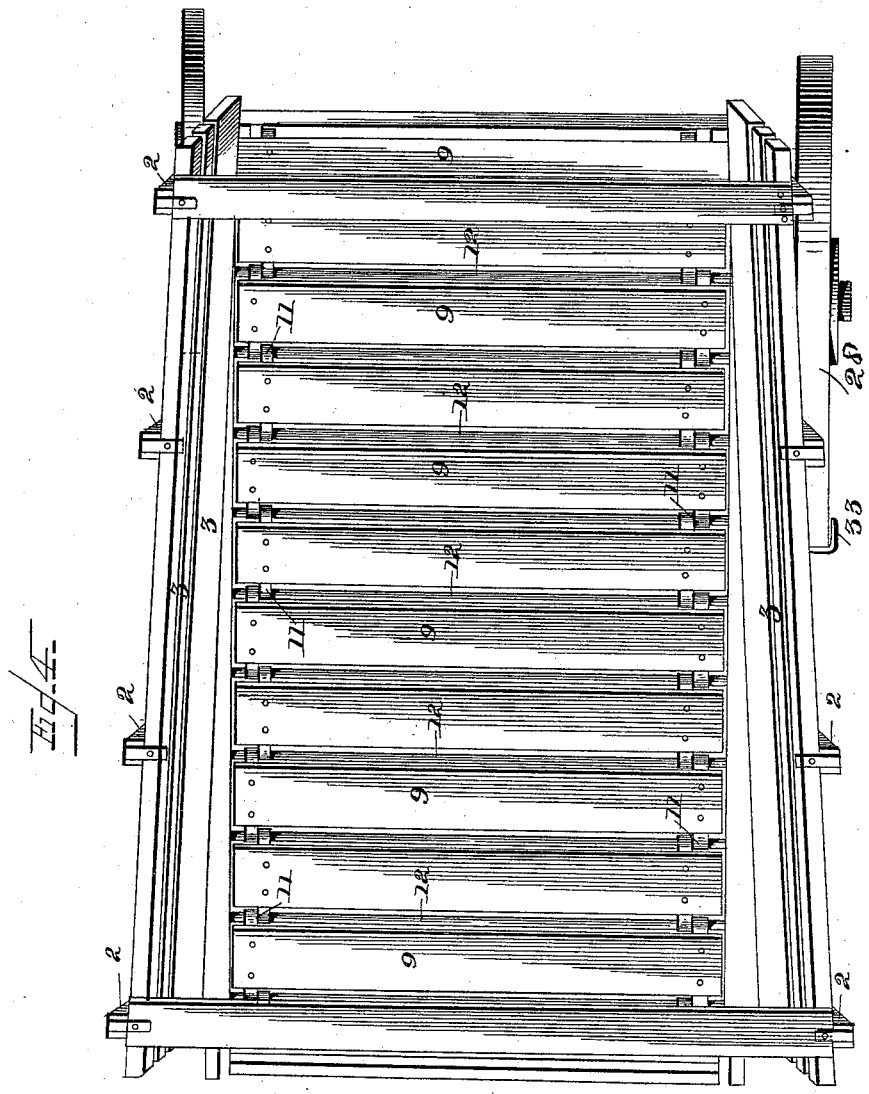
WITNESSES, INVENTOR,

UNITED STATES PATENT OFFICE.

GENRY A. CHAPMAN, OF STRAWBERRY POINT, IOWA.

HORSE-POWER.

SPECIFICATION forming part of Letters Patent No. 387,491, dated August 7, 1888.

Application filed October 29, 1887. Serial No. 253,740. (No model.)

*To all whom it may concern:*

Be it known that I, GENRY A. CHAPMAN, a citizen of the United States, and a resident of Strawberry Point, in the county of Clayton and State of Iowa, have invented certain new and useful Improvements in Horse-Powers; and I do hereby declare that the following is a full, clear, and exact description of the invention, which will enable others skilled in the art to which it appertains to make and use the same, reference being had to the accompanying drawings, which form a part of this specification, and in which—

Figure 2:
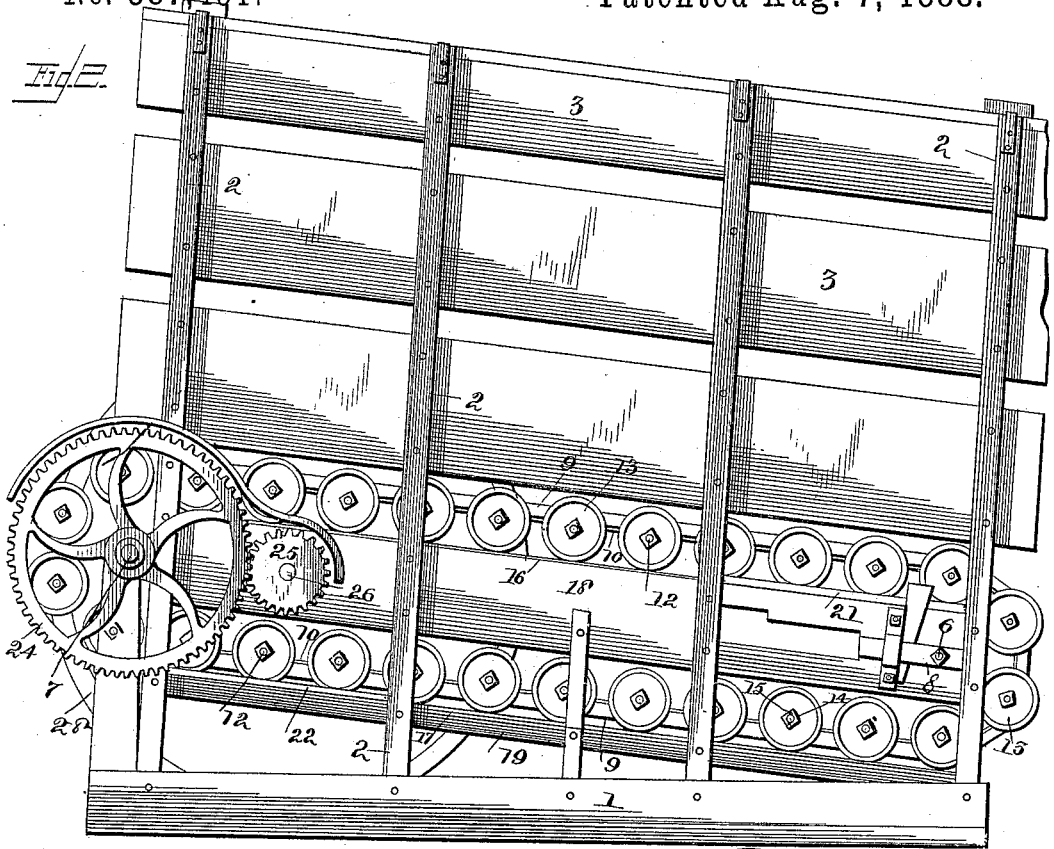
Figure 8:
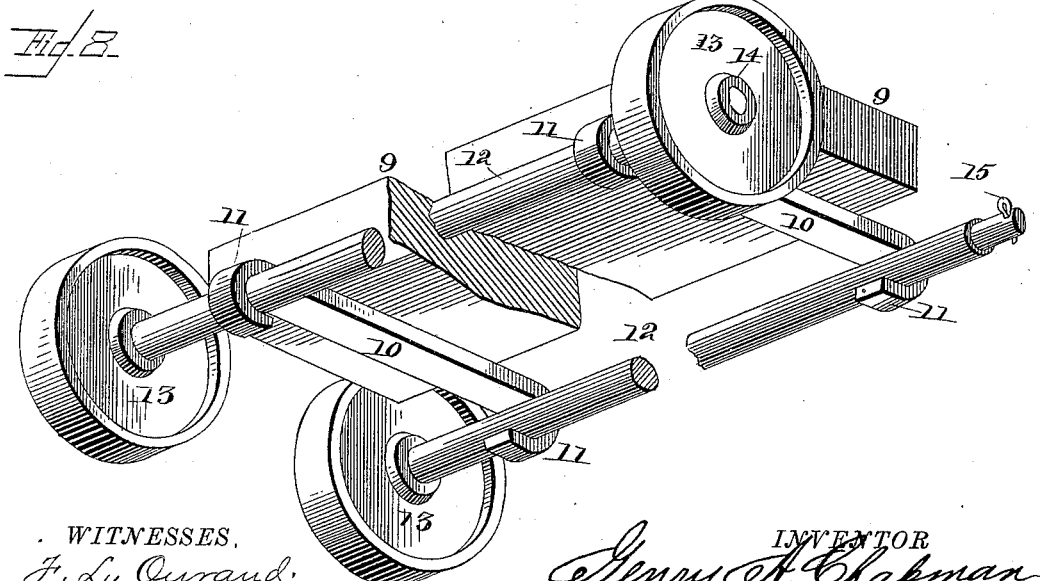

Figure 1 is a side view of my improved horse-power, seen from the side having the fly-wheel. Fig. 2 is a similar view seen from the opposite side. Fig. 3 is a longitudinal vertical sectional view of the machine. Fig. 4 is a top plan view of the machine. Fig. 5 is a perspective detail view of the regulating device for the fly-wheel, seen from above and showing parts of the wheel broken away to expose the mechanism. Fig. 6 is a perspective detail view of one of the shafts or rods for the traveling rollers or wheels. Fig. 7 is a similar view of the shaft or rod having the detachable roller or wheel, and Fig. 8 is a similar view of one end of a cross-plank or lag of the traveling bridge and of its link and of the shafts and rollers or wheels upon the shafts.

Similar numerals of reference indicate corresponding parts in all the figures.

My invention has relation to that class of horse-powers in which the animal or animals operating the power walk upon a bridge formed by cross-pieces linked together and traveling in the manner of an endless belt over reels at the ends of the box in which the animal or animals are confined; and it consists in the improved construction and combination of parts of such a power and in the improved construction and combination of parts of a regulating device for regulating and governing the speed of the bridge, as hereinafter more fully described and claimed.

In the accompanying drawings the numerals 1 indicate the sills of the power, which sills may be provided with suitable wheels or rollers for facilitating the moving of the power from one place to another, the said wheels or rollers being preferably removable, and rearwardly-inclined posts 2 are secured with their lower ends to these sills, and have the side boards or planks 3, forming the box for confining the animal, secured to them inclined rearwardly.

Two reels, 4, having radiating arms 5, projecting from near the ends of the shafts 6 and 7 of the reels, which are journaled in suitable adjustable boxes or bearings, 8, at the ends of the box formed by the uprights and planks, form supports for the bridge which forms the traveling bottom of the box, the shaft of the forward reel being journaled in a plane above the shaft of the rear reel, the traveling bridge or bottom being parallel with the edges of the side planks.

The bridge consists of transverse planks 9, having links 10 secured to the under sides of their ends, the said links having their ends 11 bent to form hooks, which may engage the shafts or rods 12 of the rollers or wheels 13, which are journaled at the ends of the shafts. The wheels or rollers are held upon the ends of the shafts by means of washers 14, which fit upon the reduced ends of the shafts and are confined upon the same by the said ends being riveted or headed, and all the wheels or rollers but one are secured in this manner, the said exceptional roller or wheel being confined by a washer and by a split key, 15.

When it is desired to take the planks or lags of the bridge apart, it is only necessary to remove the wheel having the confining washer and pin or key from the shaft, when the shaft may be drawn out of the hooked ends of the links, separating the bridge at one place and permitting the bridge to be consequently separated at any desired place, or to be entirely taken apart. The bottom planks or lower planks of the sides of the confining-box are preferably secured to the inclined uprights in such a manner that they will diverge slightly at their rear ends, as shown in Fig. 4, so that if the feet of the animal should bear against the plank at any point the movement of the bridge would carry the feet away from the planks, and thus prevent the feet of the animal bearing against the bottom planks and sliding along against them, as is liable to happen when either the animals are tired or, on account of laziness or bad habits, they lean against each other and place their feet outward.

The wheels or rollers of the bridge travel upon two metallic upper rails, 16, and two metallic lower rails, 17, secured to two pairs of wooden rails, 18 and 19, secured to the inclined posts, and the ends of the metallic wearing rails are bent and curved over the ends of the wooden rails, as shown at 20, so as to admit of the rollers passing easily off and onto the rails.

The upper rails are provided with flange-rails 21 at their outer edges, secured to the rear portions of the upper wooden rails, and the lower rails are provided in the same manner at their forward portions with flange-rails 22, secured to the wooden rails and bearing against the outer edges of the rails, the said flange-rails serving to guide the rollers off the rear ends of the upper rails and upon the rear reel and off the forward ends of the lower rail and upon the forward reel.

It will be seen that the rollers of the bridge travel upon the upper rails, revolving in one direction, and revolve in the opposite direction when they travel upon the lower rails, and for the purpose of stopping the rollers in their revolutions and permitting them to pass from one pair of rails to another without stopping the speed of the bridge by stopping and reversing the revolutions of the rollers the radiating arms of the reels will catch the shafts of the rollers and the rollers will be supported free without bearing against anything while the bridge passes around the reel, so that the rollers will have time to stop their revolutions and be ready to be revolved in the opposite direction upon leaving the reels and passing over upon the rails.

For the purpose of giving the lower rails sufficient spring to allow their rear ends to yield when the rollers strike them, the said rear portions are free, being supported at a distance from the said ends by means of a cross-piece, 23, secured to the posts; and it will be seen that the rollers will wear the tracks less and will make less noise by having the said ends yielding than by having them rigid.

The forward reel-shaft is provided at one end with a cog-wheel, 24, which meshes with a pinion, 25, upon the end of a transverse shaft, 26, journaled in bearings 27, parallel to the reel-shaft, and this shaft is provided at its other end with a fly-wheel, 28, which at the same time serves as a band-wheel.

A flat bar, 29, is attached to a block, 30, secured upon the rear side of the post next to the forward post, having a bolt, 31, passing through a longitudinal slot, 32, into the block 30. The outer end of this bar is bent forward at a right angle to nearly impinge with its inner face upon the outer face of the rim of the wheel, the said bent outer end, 33, forming a stationary shoe for the governing-brake.

The movable shoe 34 of the brake is formed by the downwardly-bent outer end of a flat slotted bar, 35, sliding longitudinally upon a bolt, 36, in the upper side of the block. The inner end of this bar is provided with an upwardly-projecting pin, 37, which bears against the inner side of the free end of a strong flat spring, 38, secured with its rear end to one of the planks of the box.

A lever, 39, is pivoted near its rear end on a fulcrum-pin, 40, upon the block 30, forward of the sliding or movable shoe 35, and has its rear end pivoted to the movable shoe, and another lever or arm, 41, is fulcrumed at its rear end upon the fulcrum-pin and has its forward forked end, 42, projecting around the shaft of the band-wheel.

The lever 41 is provided with a rearwardly-projecting lip, 43, upon its under side, and the forward end of the lever 39 may fit between the arm and the lip, being confined by the same.

The forward portion of the lever 39 is provided with an inwardly and upwardly projecting bracket, 44, through the upwardly-projecting portion of which a set-screw, 45, passes, the end of the said screw bearing against the inner edge of the arm 41.

A flat spring, 47, is secured with its rear end at the rear end of the arm 41, and is confined by means of a downwardly-projecting bracket or lip, 46, upon the arm. The operation of this spring is regulated by means of a rod, 48, which is pivotally secured at one end to the lever 49 and has its other end passed between the lip 43 and the lever 41 in front of the end of the lever 39. The lower end of the lever or handle 49 is loosely secured at its lower end to the side of the confining-box and its upper end is confined behind a guide-bar, 50.

A lever, 51, is pivoted with its lower end upon the sill of the machine, and has its upper end rocking behind a guide-bar, 52, and is provided at its middle with a pivoted hook, 53, with which it may engage the bifurcated arm of the arm 41.

Two curved arms, 54, are pivotally secured near one end to two diametrically-opposite spokes of the band-wheel, and are connected together by means of the rod 55, one end of which is secured to the short end of one of the arms and at the other end to the long end of the other arm. A short connecting-rod, 56, is pivotally secured at one end to the short end of this second arm, and at the opposite end it engages with a bell-crank, 57, which is fulcrumed upon one of the spokes of the wheel.

The other arm of this bell-crank is bifurcated, as shown at 58, and the trunnions 59 of a sleeve, 60, work in the arms of the bifurcated portion, the sleeve sliding upon the shaft of the band-wheel and bearing against the bifurcated end of the arm 41. It will now be seen that when the band-wheel is revolved, the longer ends of the curved arms will be thrown outward by the centrifugal force, which, through the rod 56 and the bell-crank 57, will force the sleeve inward upon the shaft against the bifurcated end of the arm 41. As this end is forced inward the arm 41 will bear against the end of the set-screw of the lever 39, which will tilt the forward end of the lever inwardly, throwing the short rear end of the lever outwardly and forcing the movable brake shoe against the inner side of the rim of the wheel, slowing its revolution, and as soon as the revolution of the wheel has been sufficiently retarded the curved arms will again have their longer portions forced inwardly by the force of the spring, drawing the movable shoe inwardly, and, by the force of the flat spring upon the pivoted arm, operating the brake-lever, the tension of the said spring being increased by tilting the lever having the rod bearing against the end of the spring outward, and vice versa. It will thus be seen that the movable brake-shoe may be adjusted to suit the width of the rim of the wheel by the set-screw in the bracket of the brake-lever, and the number of revolutions in a given space of time may be governed by adjusting the governing-lever, which may be set to increase the tension of the flat spring, so as to cause greater resistance against the spreading out of the curved arms, and consequently against the application of the brake, admitting of a greater speed; or it may be set to decrease the tension of the spring, when the curved arms may respond easier, and thus operate the brake, when a considerably less speed is imparted to the wheel.

Having thus described my invention, I claim and desire to secure by Letters Patent of the United States—

1. In a horse-power, the combination of the confining-box, the sides of which diverge toward the rear end, and an endless bridge.

2. In a horse-power, the combination, with the confining-box having an endless traveling bridge, of a band-wheel upon the side of the box, two curved arms pivotally secured upon diametrically-opposite spokes of the wheel, a rod connecting the short end of one of the arms with the long end of the other arm, a bell-crank upon one of the spokes of the wheel, a rod connecting the short end of the second curved arm with the bell-crank, a sleeve upon the hub of the wheel engaging with the other arm of the bell-crank, and a brake connected with the sleeve.

3. In a horse-power, the combination, with the confining-box having an endless traveling bridge, of a band-wheel upon the side of the box, a block secured to the side of the box near the periphery of the wheel, a flat bar adjustably attached to the block, the outer end of which is bent forwardly upon the outer side of the periphery of the wheel, and a movable brake attached to the block, the outer end of which is bent and adapted to be forced against the inner side of the periphery of the wheel.

4. In a horse-power, the combination, with the confining-box having an endless traveling bridge and a band-wheel upon the side of the box, of a slotted bar adjustably secured to the side of the box, the outer end of which is bent upon the outer side of the wheel, and a spring-actuated brake also secured to the side of the box, the outer end of which is bent and adapted to be forced against the inner side of the wheel.

5. In a horse-power, the combination, with the confining-box having an endless traveling bridge and a band-wheel upon the outer side of the box, of a brake-lever pivotally secured to the side of the box, a brake-shoe connected with the outer end of the lever, and an automatic regulating device adjustably connected with the other end of the lever.

6. In a horse-power, the combination, with the confining-box having an endless traveling bridge and a band-wheel upon the side of the box, of two arms or levers pivotally secured to the side of the box near the periphery of the wheel, a brake-shoe attached to the outer end of one of the levers, and a sleeve upon the hub of the wheel adapted to engage with the opposite end of the other lever, the inner ends of said levers being adjustably connected with each other.

7. In a horse-power, the combination, with the confining-box having an endless traveling bridge and a band-wheel upon the side of the box, of two levers pivotally secured upon the side of the box, a brake-shoe secured to the outer end of one of the levers, and an adjusting-screw secured to the inner end of the same lever, a spring secured to the inner end of the other lever near its pivotal point, a handle upon the side of the box, and a rod near its lower end, the outer end of which engages with the spring.

8. In a horse-power, the combination, with the confining-box having an endless traveling bridge and a wheel upon the side of the box, of a sleeve upon the hub of the wheel, two levers pivotally secured to the side of the box, the inner end of one of which is bifurcated and engages with the sleeve, a lip upon the under side of the lever, a brake-shoe upon the outer end of the other lever, the inner end of said second lever engaging with the lip of the first-mentioned lever, a handle or lever upon the side of the box, and a hook pivotally secured to the handle and adapted to engage with the first-mentioned lever.

In testimony that I claim the foregoing as my own I have hereunto affixed my signature in presence of two witnesses.

GENRY A. CHAPMAN.

Witnesses:
C. F. CHAPMAN,
ROY PHELPS.